United States Patent [19]

Nukiyama

[11] Patent Number: 4,779,220
[45] Date of Patent: Oct. 18, 1988

[54] FLOATING-POINT DATA ROUNDING AND NORMALIZING CIRCUIT

[75] Inventor: Tomoji Nukiyama, Tokyo, Japan

[73] Assignee: Nec Corporation, Tokyo, Japan

[21] Appl. No.: 31,062

[22] Filed: Mar. 27, 1987

[30] Foreign Application Priority Data

Mar. 27, 1986 [JP] Japan .................................. 61-70117

[51] Int. Cl.⁴ .............................................. G06F 7/48
[52] U.S. Cl. ..................................... 364/748; 364/745
[58] Field of Search ................................ 364/748, 745

[56] References Cited

U.S. PATENT DOCUMENTS

| | | | |
|---|---|---|---|
| 4,295,203 | 10/1981 | Joyce .................................. | 364/748 |
| 4,429,370 | 1/1984 | Blau et al. ........................... | 364/748 |
| 4,468,748 | 8/1984 | Blau et al. ........................... | 364/748 |
| 4,562,553 | 12/1985 | Mattedi et al. ...................... | 364/745 |
| 4,592,006 | 5/1986 | Hagiwara et al. ................... | 364/748 |

*Primary Examiner*—David H. Malzahn
*Attorney, Agent, or Firm*—Foley & Lardner Schwartz Jeffery, Schwaab, Mack, Blumenthal & Evans

[57] ABSTRACT

A floating-point data rounding and normalizing circuit comprises a shift controller receiving a fraction portion of an input floating-point data for generating a shift control signal indicative of a shift amount required for normalization. A barrel shifter receives the fraction portion of the input floating-point data and is controlled by the shift control signal to shift the fraction portion by the required amount. A round circuit receives the shifted fraction portion for rounding it, and if an overflow occurs in the rounding operation by the rounding circuit, it is detected by a detector. A rounded fraction is inputted to another shifter controlled by the overflow detector so as to shift back the rounded fraction output one bit in response to generation of the overflow. Further, an encoder are provided to generate a two's complement of a binary number indicating the above mentioned required shift amount, and an addition circuit receiving an exponent portion of the input floating-point data, the two's complement and an output of the overflow detecting means for generating a normalized exponent data.

6 Claims, 1 Drawing Sheet

FLOATING-POINT DATA ROUNDING AND NORMALIZING CIRCUIT

BACKGROUND OF THE INVENTION

1. Field of the Invention

The present invention relates to a floating-point data rounding and normalizing circuit, and more particularly to such a circuit capable of executing rounding, normalizing and overflow correction of a numerical data representative of two's complement in parallel at a high speed.

2. Description of Related Art

A floating-point representation can make the range of expressible numbers independent of the number of significant digits, and therefore, is widely used in data processing systems. However, a floating-point arithmetic operation needs a floating-point normalization. Namely, a floating-point arithmetic circuit must have a floating-point normalizing circuit. Conventionally, a typical floating-point normalizing circuit includes a comparator receiving two multi-bit numbers A and B to determine which is larger, A or B. This comparator controls a multiplexor which also receives the two input numbers A and B, so that the multiplexor outputs a larger one of the two input numbers to a shift and count circuit (SAC). This SAC circuit leftwardly shifts the input number until the shifted number has a nonzero leftmost digit, i.e., "1" at the most significant digit, and at the same time the SAC circuit counts the amount of the shift. Thus, the SAC circuit outputs the result of the count to an encoder, which is in turn converts the counted value into an exponent data in a floating-point representation. Further, the output of the SAC circuit is supplied to a pair of shifters which receive the input numbers A and B, respectively, so that the respective shifters shift the respective input numbers the same amount indicated by the SAC circuit.

The two numbers A and B thus shifted are outputted from the respective shifters to a processing unit, which in turn executes a designated arithmetic operation to the two input numbers so as to output the result of the arithmetic operation as a fraction or mantissa in a floating-point representation.

In the above mentioned normalization, to ensure sufficient precision, not only normalization but also rounding are required. Further, it is necessary to make correction on the basis of overflow caused in the rounding operation. However, the normalization, the rounding and the overflow correction involve complicated processings, which need either a long time of operation or a large amount of hardware. Particularly, in the case that a high speed operation, a required hardware will inevitably become extensive.

Specifically, a mantissa or fraction portion of an input floating-point data is checked by the shift and count (SAC) circuit so that a required amount of leftward shift is determined. The fraction portion of the input floating-point data is lefwardly shifted by the required amount designated by the SAC circuit. In a high speed operation, this leftward shift is parallel-processed by using a barrel shifter. On the other hand, the value corresponding the amount of leftward shift is subtracted from an exponent portion of the input floating-point data. If an underflow occurs in the exponent portion as the result of this subtraction, a necessary correction is made.

In a succeeding rounding operation, a less significant bit portion of the shifted fraction portion is cut away, so that a predetermined bit number of more significant bits is outputted. In this operation, if the most significant bit of the cut-away less significant bit portion is "1", "1" is added to the least significant bit of the fraction data composed of more significant bits. As the result of this addition, if an overflow occurs, the fraction data is shifted rightwardly one bit. Further, "1" is added to the exponent data, and if an overflow then occurs, a necessary correction is made.

The above mentioned normalizing and rounding operation for the floating-point data is executed by using a parallel wired-logic in a high speed operation unit. However, since the overflow correction must be executed on the basis of the result of the arithmetic operation, it has become a hindrance to a high speed operation, and also needs additional hardware. This is inconvenient to the speed-up of operation in the case that the system is constituted of a large scale integrated circuit.

SUMMARY OF THE INVENTION

Accordingly, it is one object of the present invention to provide a floating-point data rounding and normalizing circuit capable of executing a rounding and normalizing at a high speed.

Another object of the present invention is to provide a floating-point data rounding and normalizing circuit capable of executing a rounding and normalizing at a high speed and having a simple circuit construction.

The above and other objects of the present invention are achieved in accordance with the present invention by a floating-point data rounding and normalizing circuit comprising means receiving a fraction portion of an input floating-point data for generating a shift control signal indicative of a shift amount required for normalization, first shift means receiving the fraction portion of the input floating-point data and controlled by the shift control signal to shift the fraction portion by the required amount, means receiving the shifted fraction portion for rounding it, means for detecting an overflow in the rounding operation by the rounding means, second shift means receiving a rounded fraction output from the rounding means and controlled by the overflow detecting means so as to shift back the rounded fraction output one bit in response to generation of the overflow, means generating a two's complement of a binary number indicating the above mentioned required shift amount, and addition means receiving an exponent portion of the input floating-point data, the two's complement and an output of the overflow detecting means for generating a normalized exponent data.

With the above arrangement, the shift amount of the fraction portion is given in the form of a two's complement for correction of the exponent portion. Therefore, the subtraction of the exponent portion in accordance with the shift amount of the fraction portion can be replaced by addition of the two's complement. Accordingly, the subtraction of the exponent portion in accordance with the shift amount of the fraction portion and the addition of the exponent portion required by the overflow of the rounding operation can be executed one time by a single addition operation of the exponent portion of the input floating-point data, the two's complement indicative of the required shift amount of the fraction portion and the output of the overflow detection means.

Thus, the rounding and normalization can be executed by a simple circuit with a small number of operation at a high speed.

In one embodiment, the means for generating the normalized exponent data includes a second arithmetic and logic unit having a first input connected to receive the exponent portion of the floating-point data and a second input connected to receive the two's complement, the second arithmetic and logic unit receiving at its carry input of the least significant bit the output of the overflow detecting means.

Preferably, the means for generating the normalized exponent data also includes a second overflow detecting means connected to a carry output of the second arithmetic and logic unit, and a third shift means receiving an output of the second arithmetic and logic unit and controlled by the second overflow detecting means to shift the exponent portion in response to detection of an overflow by the second overflow detecting means.

The above and other objects, features and advantages of the present invention will be apparent from the following description of preferred embodiments of the invention with reference to the accompanying drawings.

DESCRIPTION OF THE PREFERRED EMBODIMENT

Figure 1:
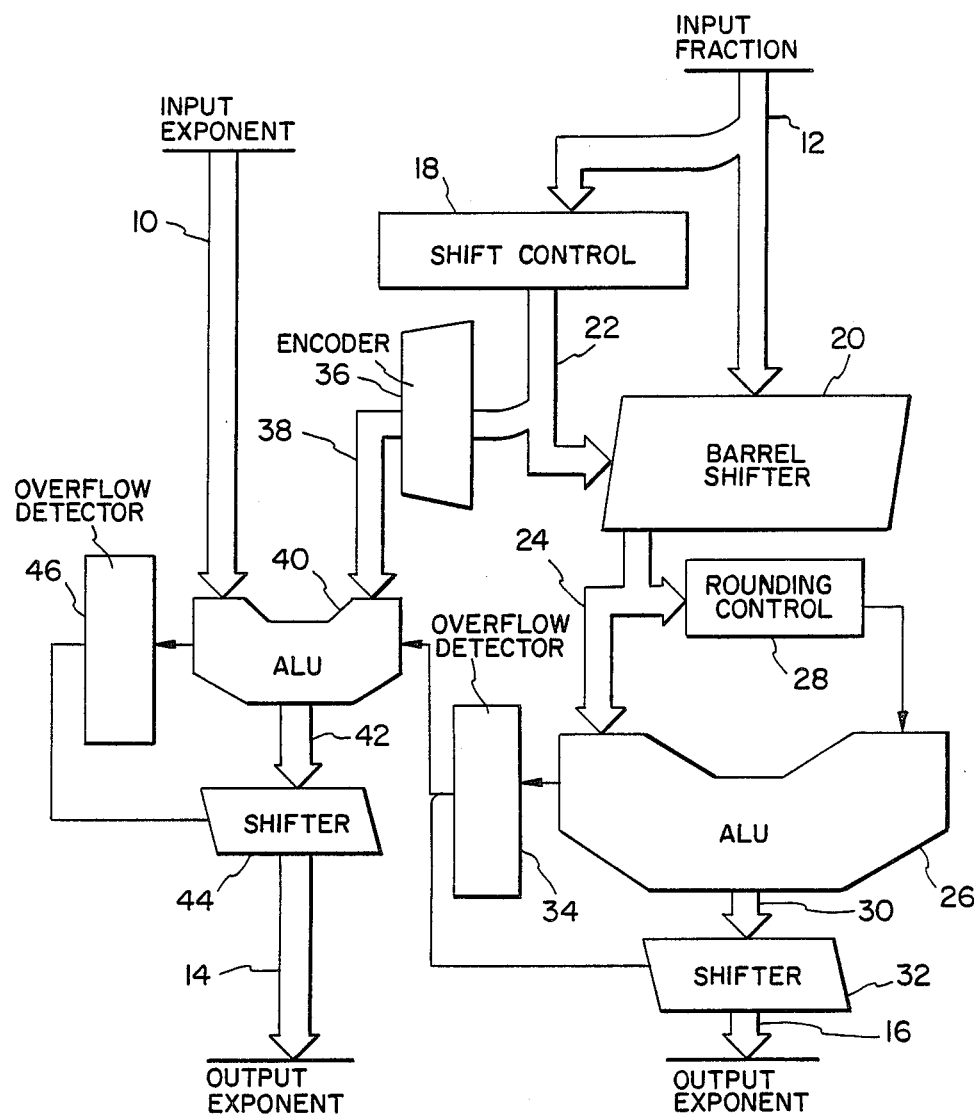
FIG. 1 is a block diagram of one embodiment of the floating-point data rounding and normalizing circuit in accordance with the present invention

Referring to FIG. 1, there is shown a block diagram of one embodiment of the floating-point data rounding and normalizing circuit in accordance with the present invention. The shown rounding and normalizing circuit is adapted to receive through input data buses 10 and 12 an exponent portion and a mantissa or fraction portion of an input floating-point data representative of two's complement, respectively. In this embodiment, for example, the exponent portion is composed of eight bits and the fraction portion includes 24 bits. In addition, the shown rounding and normalizing circuit is adapted to output an exponent of 8 bits and a fraction of 16 bits through output data buses 14 and 16, respectively. Namely, a 32-bit data is inputted, and a 24-bit data is outputted.

For the above function, the shown rounding and normalizing circuit comprises a shift controller 18 and a normalizing circuit such as a barrel shifter 20, which respectively receive the fraction portion inputted through the input bus 12. The shift controller 18 inspects the bit pattern of the input fraction data so as to detect a leftmost bit having a predetermined binary value. As mentioned above, since the input data is representative of two's complement, the shift controller 18 detects a leftmost "1" if the input fraction data is positive, and a leftmost "0" if the input data is negative. The shift controller 18 is adapted to output to the barrel shifter 20 a shift control signal indicative of the shift amount determined by the digit position of the detected leftmost bit having the predetermined binary value "0" or "1". For example, this control signal is composed of 24 bits which include only one active bit at the digit position of the detected leftmost bit, and fed through a bus 22 of 24 bits to the barrel shifter 20.

The barrel shifter 20 is capable of shifting the input fraction data of 24 bits leftwardly at any amount within the range of 0 bits to 23 bits. The shifter 20 is controlled by the shift control signal to shift the input fraction data leftwardly by the amount indicated by the shift control signal.

Of the 24-bit fraction data thus shifted, 16 more significant bits from the most significant bit to a sixteenth bit are fed through a bus 24 to one input of a rounding circuit such as an arithmetic and logic unit (ALU) 26. Further, a seventeenth bit of the shifted 24-bit data is fed to the other input of the ALU 26 through a rounding controller 28 which is constituted of a mask circuit allowing a passage of only the 17th bit.

Specifically, the output bit of the rounding controller 28 is inputted as a 16th bit to the ALU 26. Namely, all the first bit to the 15th bit of the other input of the ALU 28 are inputted with "0". The ALU 26 functions to add the two inputs and outputs a 16-bit addition result through a 16-bit bus 30 to a shifter 32. Further, the ALU 26 has a carry output which is connected to an overflow detector 34. When an overflow occurs, the overflow detector 34 controls the shifter 32 so as to cause the shifter 32 to shift the input data rightwardly by only one bit and also to put "1" in the most significant bit of an output of the shifter 32. On the other hand, if an overflow does not occurs, the overflow shifter 32 allows the shifter 32 to output the input data without shift. The output of the shifter 32 is coupled to the output fraction bus 16.

Furthermore, the shift control signal of 24 bits from the shift controller 18 is also inputted to an encoder 36, where the 24-bit signal having one only active bit, whose digit position indicates the required amount of shift, is converted into a 5-bit two's complement indicative of the shift amount. This 5-bit output of the encoder 36 is suppled through a 5-bit bus 38 to one input of an exponent normalizing and rounding circuit composed of another ALU 40. This ALU 40 receives at its other input the exponent data of two's complement supplied through the input bus 10, and also receives at its carry input of the least significant bit the overflow signal from the overflow detector 34. The ALU 40 executes an addition operation among the three inputs, and outputs the result of addition through a 16-bit bus 42 to another shifter 44, whose output is coupled to the output exponent bus 14. Further, the ALU 40 has a carry output connected to another overflow detector 46. This detector 44 controls the shifter 44, similarly to the control of the detector 34 to the shifter 32.

Next, explanation will be made on operation of the floating-point data rounding and normalizing circuit as mentioned above.

In the embodiment, as mentioned hereinbefore, the input data is constituted of the fraction data of 24 bits and the exponent data of 8 bits, which are repesentative of two's complements, respectively. The input data has not yet been normalized.

The fraction data of 24 bits is inputted to the shift controller 18 and the barrel shifter 20 in parallel. The shift controller 18 detects the leftmost "0" or "1" in the bit pattern of the input fraction data and generates the shift control signal indicative of a shift amount required for normalization. Specifically, the shift controller 18 decodes the most significant bit (the leftmost bit) of the input fraction data, and searches a leftmost "1" in the case that the most significant bit is "0". On the other hand, if the most significant bit is "1", the shift controller 18 investigates a leftmost "0". Then, the shift controller 18 generates the shift control signal 22 of 24 bits in which only one bit corresponding to the detected leftmost "1" or "0" is "1" and the other 23 bits are "0".

In response to the shift control signal 22 from the shift controller 18, the barrel shifter 20 shifts the input fraction data leftwardly by a required amount in the range of 0 bit to 23 bits. For example, if a leftmost bit different from the binary value of the most significant bit is detected at a (n)th position from the most significant bit (the shift control signal of 24 bits has a bit of "1" at the (n)th position from the most significant bit), the barrel shifter 20 shifts the input fraction data leftwardly by (n−2) bits.

Of the 24-bit fraction data 24 thus shifted, a portion from the most significant bit to a 16th bit is inputted to the one input of the ALU 26, and a 17th bit is inputted through the rounding controller 28 to the other input of the ALU 26. As mentioned hereinbefore, the rounding controller 28 discriminates whether the 17th bit should be counted up to the 16th bit or cut away. For example, if the 17th bit is "1", a signal of "1" is supplied to the other input of the ALU 20, and if the 17th bit is "0", a signal of "0" is applied to the other input of the ALU 20. The ALU 20 adds the two input data and outputs the result of addition through the bus 30 to the shifter 32. If an overflow occurs in the addtion, it is detected by the overflow detector 34, which controls the shifter 32. Namely, if an overflow occurs, the overflow controller 34 controls the shifter 32 to cause the shifter 32 to shift the input data rightwardly one bit and to put "1" in the most significant bit of the rightwardly shifted data. But, if no overflow occurs, the controller 34 causes the shifter 32 to output the input data as it is.

On the other hand, the encoder 36 generates a two's complement of the leftward shift amount (n−2) indicated by the control signal outputted from the shift controller. The following Table 1 shows the relation between the input fraction data 12, the shift control signal 22 of the shift controller 18, the output 38 of the encoder 36 and the amount of leftward shift given by the barrel shifter 20.

of "1" in the shift control signal 22, the barrel shifter 20 shifts the input data leftwardly by the (n−2) bits. On the other hand, the encoder 36 encodes the control signal 22 and generates the two's complement of the five-bit binary number indicating the shift amount (n−2).

But, if the input fraction data of 24 bits has the most significant bit of "1", the shift controller 18 detects the leftmost "0" and generates the control signal 22 of 24 bits which has only one bit of "1" at a position corresponding to the detected leftmost "0" and which has the remaining 23 bits of "0". The barrel shifter 20 and the encoder 36 operate in accordance with the shift control signal 22, similarly to the case in which the input fraction data includes the most significant bit of "0".

The output of the encoder 36 representative of the two's complement of the binary value of the shift amount (n−2) is applied to the other output of the ALU 40, which receives the input exponent data 10 and the overflow signal from the overflow detector 34. The ALU 40 executes an addition operation between the three inputs and outputs the result of addition to the shifter 44. If an overflow occurs in this addition, it is detected by the overflow detector 46, which in turn causes the shifter 44 to shift the input data rightwardly one bit.

Thus, the shifters 32 and 44 output normalized and rounded fraction data 16 and exponent data 14, respectively.

In the above embodiment, the encoder 36, which encodes the fraction shift amount signal, is adapted to generate a two's complement of the binary value of a required shift amount. Therefore, the subtraction of the exponent data required as the result of the normalization and the addition of the exponent data for the overflow correction in the rounding operation can be executed by only one adder means such as the ALU 40. Accordingly, the amount of the hardware required by the floating-point data rounding and normalizing circuit can be decreased, and also, the speed of operation can be increased greatly.

TABLE 1

| INPUT FRACTION DATA OF 24 BITS | SHIFT CONTROL SIGNAL OF 24 BITS | ENCODER OUTPUT OF 5 BITS | LEFTWARD SHIFT AMOUNT OF BARREL SHIFTER |
|---|---|---|---|
| 01xxx . . . xxxx | 01000 . . . 0000 | 00000 | 0 |
| 001xx . . . xxxx | 00100 . . . 0000 | 11111 | 1 |
| 0001x . . . xxxx | 00010 . . . 0000 | 11110 | 2 |
| : | : | : | : |
| : | : | : | : |
| 00000 . . . 01xx | 00000 . . . 0100 | 01100 | 20 |
| 00000 . . . 001x | 00000 . . . 0010 | 01011 | 21 |
| 00000 . . . 0001 | 00000 . . . 0001 | 01010 | 22 |
| 10xxx . . . xxxx | 01000 . . . 0000 | 00000 | 0 |
| 110xx . . . xxxx | 00100 . . . 0000 | 11111 | 1 |
| 1110x . . . xxxx | 00010 . . . 0000 | 11110 | 2 |
| : | : | : | : |
| : | : | : | : |
| 11111 . . . 10xx | 00000 . . . 0100 | 01100 | 20 |
| 11011 . . . 110x | 00000 . . . 0010 | 01011 | 21 |
| 11111 . . . 1110 | 00000 . . . 0001 | 01010 | 22 |

As seen from the above Table 1, if the input fraction data of 24 bits has the most significant bit of "0", the shift controller 18 generates the shift control signal 22 of 24 bits which has only one bit of "1" at a position corresponding to the leftmost "1" of the input fraction data and which has the remaining 23 bits of "0". As mentioned above, assuming that "n" indicates the number of bits started from the most significant bit to the bit The above mentioned embodiment processes the floating-point data including the exponent of 8 bits and the fraction of 24 bits and outputs the normalized and rounded floating-point data including the exponent of 8 bits and the fraction of 16 bits. But, the bit numbers of the input data and the output data are not limited to those of the embodiment, and can be freely selected.

The invention has thus been shown and described with reference to specific embodiments. However, it should be noted that the invention is in no way limited to the details of the illustrated structures but changes and modifications may be made within the scope of the appended claims.

I claim:

1. A floating-point data rounding and normalizing circuit comprising means receiving a fraction portion of an input floating-point data for generating a shift control signal indicative of a shift amount required for normalization, first shift means receiving the fraction portion of the input floating-point data and controlled by the shift control signal to shift the fraction portion by the required amount, means receiving the shifted fraction portion for rounding it, means for detecting an overflow in the rounding operation by the rounding means, second shift means receiving a rounded fraction output from the rounding means and controlled by the overflow detecting means so as to shift back the rounded fraction output one bit in response to generation of the overflow, means generating a two's complement of a binary number indicating the above mentioned required shift amount, and addition means receiving an exponent portion of the input floating-point data, the two's complement and an output of the overflow detecting means for generating a normalized exponent data.

2. A circuit as claimed in claim 1 wherein the first shift means is composed of a barrel shifter receiving the fraction portion of the input floating-point data and controlled by the shift control signal.

3. A circuit as claimed in claim 1 wherein the rounding means includes an arithmetic and logic unit having a pair of inputs, one of which is connected to receive a predetermined number of more significant bits of the first shift means output including the most significant bit, and the other input being connected to receive a less significant bit of the first shift means output next to the predetermined number of more significant bits.

4. A circuit as claimed in claim 3 wherein the rounding means also including a mask means receiving the output of the first shift means to supply the other input of the arithmetic and logic circuit with one less significant bit of the shift means output next to the predetermined number of more significant bits.

5. A circuit as claimed in claim 1 wherein the means for generating the normalized exponent data includes a second arithmetic and logic unit having a first input connected to receive the exponent portion of the floating-point data and a second input connected to receive the two's complement, the second arithmetic and logic unit receiving at its carry input of the least significant bit the output of the overflow detecting means.

6. A circuit as claimed in claim 5 wherein the means for generating the normalized exponent data also includes a second overflow detecting means connected to a carry output of the second arithmetic and logic unit, and a third shift means receiving an output of the second arithmetic and logic unit and controlled by the second overflow detecting means to shift the exponent portion in response to detection of an overflow by the second overflow detecting means.

* * * * *